Jan. 30, 1940.   H. JAGGER   2,188,599
DUPLICATING APPARATUS
Filed Oct. 27, 1938   8 Sheets-Sheet 3
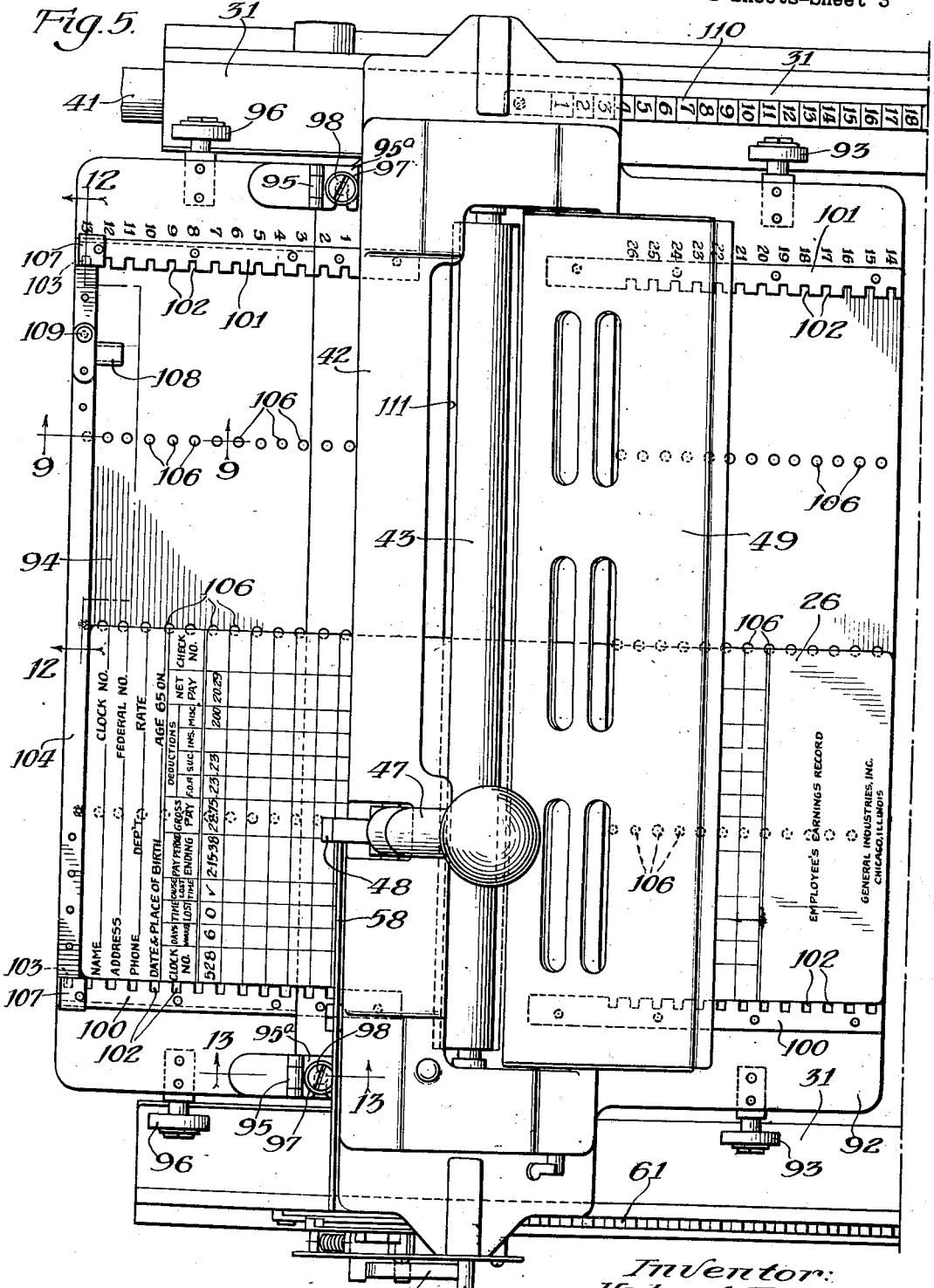

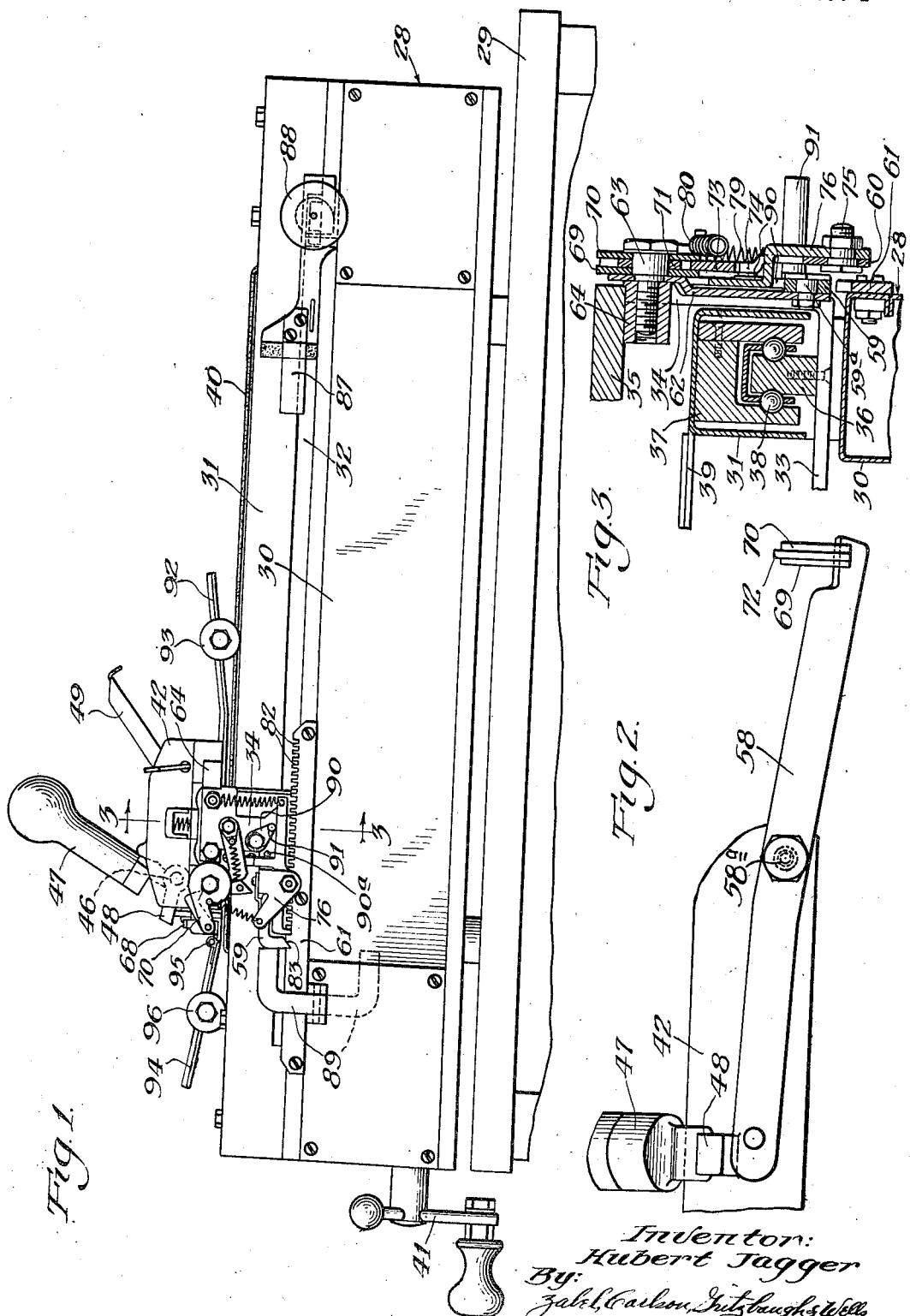

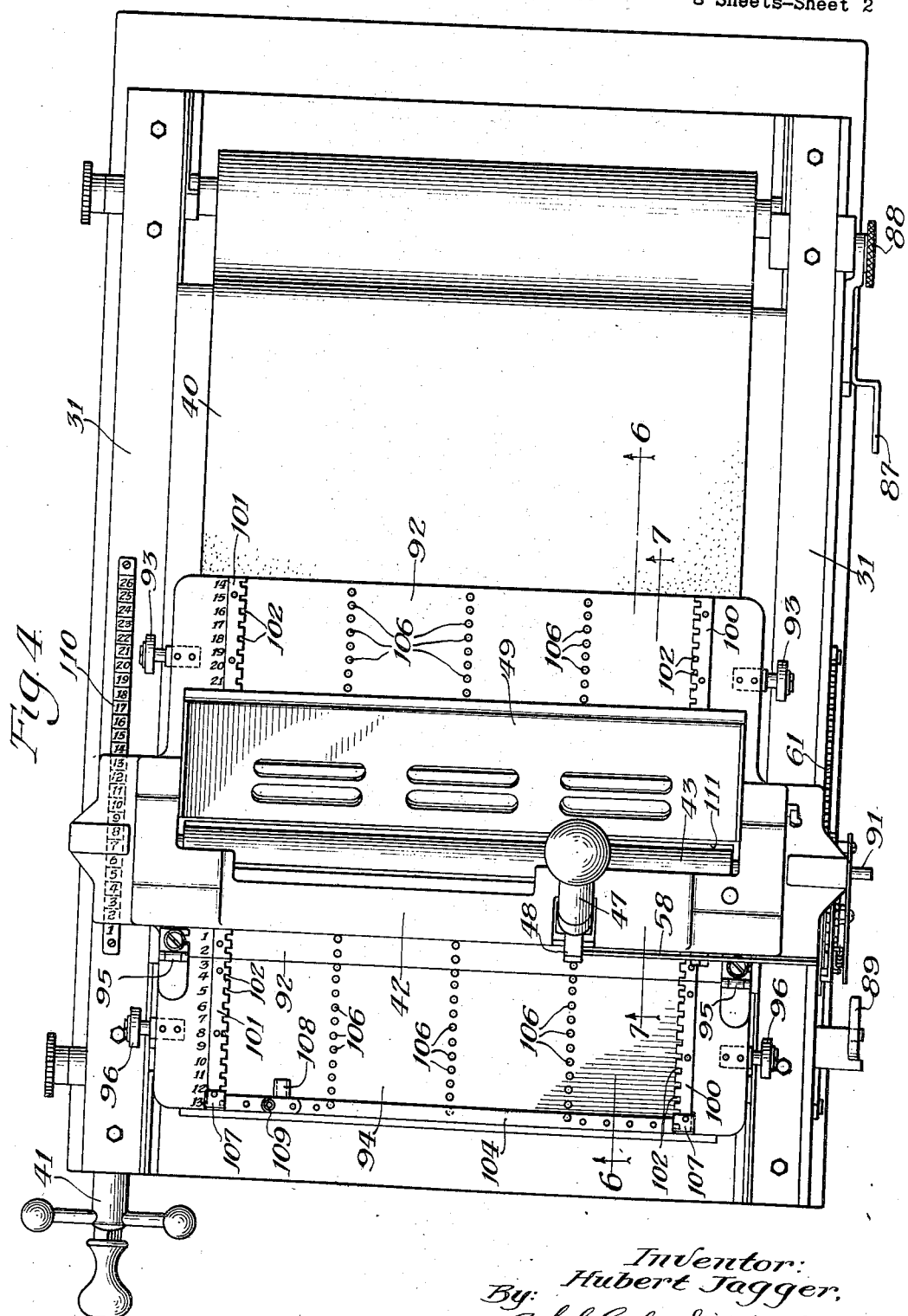

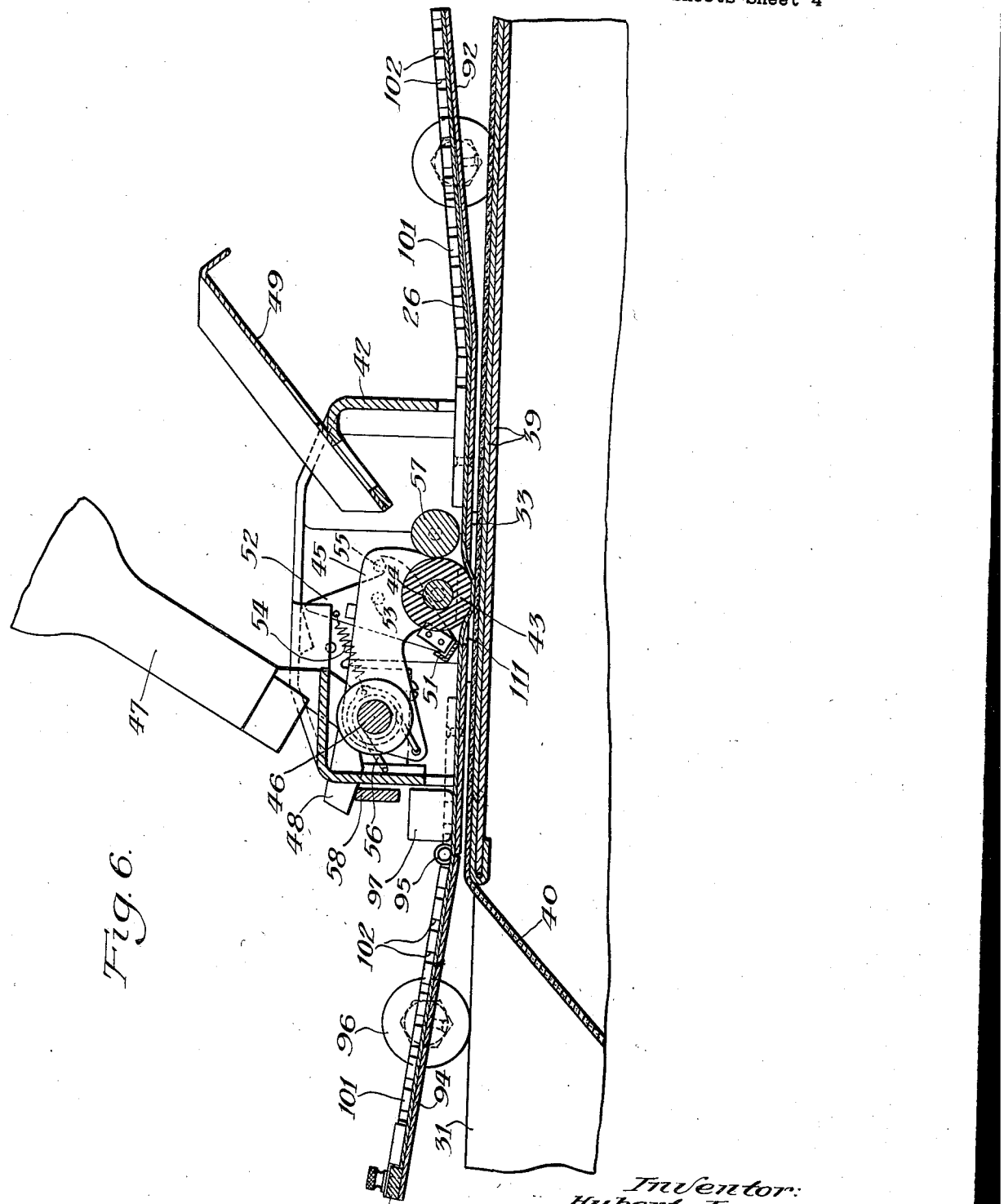

Jan. 30, 1940.   H. JAGGER   2,188,599
DUPLICATING APPARATUS
Filed Oct. 27, 1938   8 Sheets-Sheet 5
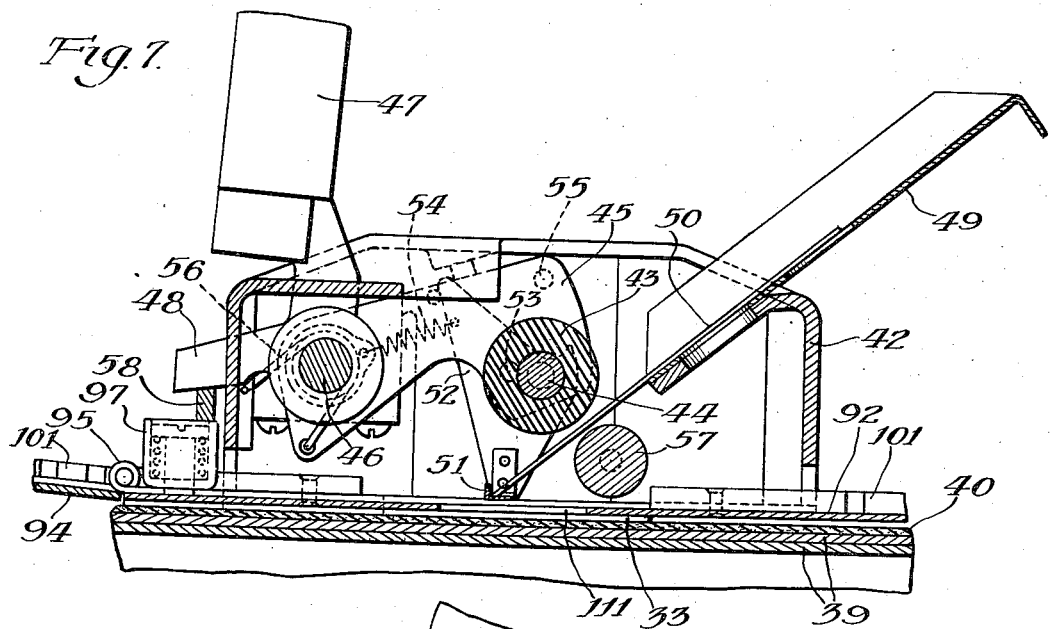
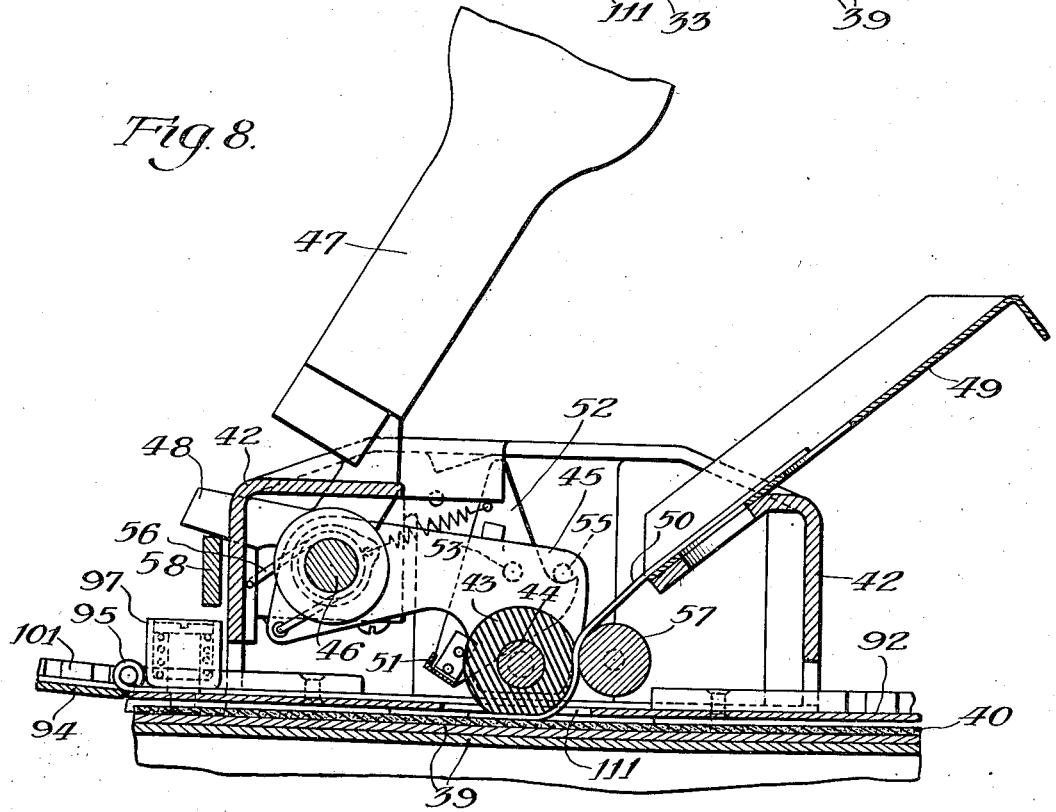
Inventor:
Hubert Jagger,
By Zabel, Carlson, Greitzlaugh & Wells
Attorneys Jan. 30, 1940.  H. JAGGER  2,188,599
DUPLICATING APPARATUS
Filed Oct. 27, 1938  8 Sheets-Sheet 6
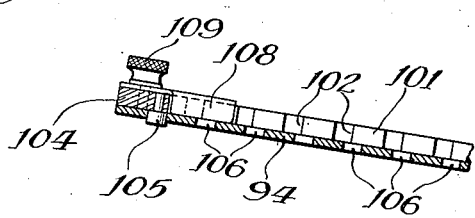
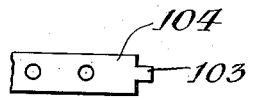
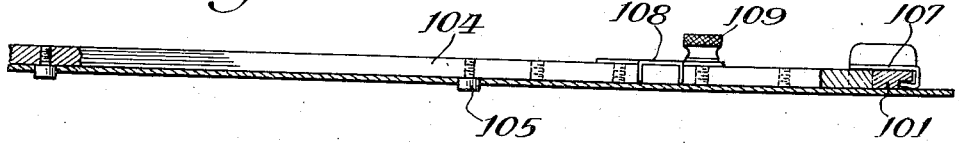
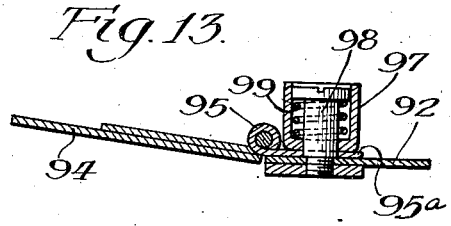
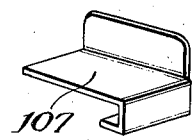
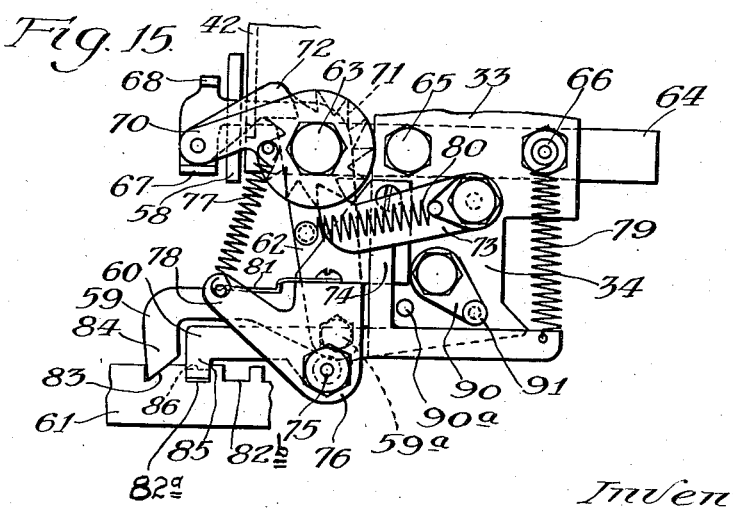
Inventor:
Hubert Jagger,
By Zabel, Carlson, Gietzlaugh & Well
Attorneys Jan. 30, 1940.    H. JAGGER    2,188,599

DUPLICATING APPARATUS

Filed Oct. 27, 1938    8 Sheets-Sheet 7

Fig. 16.

GENERAL INDUSTRIES, INC.
CHICAGO, ILLINOIS
PAYROLL SUMMARY

PAYROLL FOR DEPT_____ FROM_____ TO_____ PAGE_____ NO. PAGES_____

| | HOURS DAILY | | | | | TOTAL HOURS | RATE | HOUR EARNINGS | BONUS | NAME AND FEDERAL NO. | CLOCK NO. | DAYS WORK'D | TIME LOST | CAUSE LOST TIME | PAY PERIOD ENDING | GROSS PAY | DEDUCTIONS | | | | NET PAY | CHECK NO. |
|---|---|---|---|---|---|---|---|---|---|---|---|---|---|---|---|---|---|---|---|---|---|---|
| | M | T | W | T | F | S | | | | | | | | | | | | F.O.A. | S.U.C. | INS. | MISC. | | |
| 1 | 9 | 9 | 8 | 7 | 4 | 45 | .50 | 22.50 | .25 | John Doe 322-01-0975 | 528 | 6 | 0 | ✓ | 5-15-38 | 22.75 | .23 | .23 | | 2.00 | 20.29 | |
| 2 | 8 | 8 | 8 | 8 | 4 | 44 | .38 | 16.72 | | R. Martin 322-01-0842 | 529 | 6 | 0 | ✓ | 5-15-38 | 16.72 | .17 | .17 | | 1.50 | 14.88 | |
| 3 | 8 | 8 | 8 | 8 | 8 | 40 | .75 | 30.00 | | A. Stano 322-01-0746 | 530 | 5 | 4 | S | 5-15-38 | 30.00 | .30 | .30 | | 5.00 | 24.40 | |
| 4 | | | | | | | | | | | | | | | | | | | | | | |
| 5 | | | | | | | | | | | | | | | | | | | | | | |
| 6 | | | | | | | | | | | | | | | | | | | | | | |
| 7 | | | | | | | | | | | | | | | | | | | | | | |
| 8 | | | | | | | | | | | | | | | | | | | | | | |
| 9 | | | | | | | | | | | | | | | | | | | | | | |
| 10 | | | | | | | | | | | | | | | | | | | | | | |
| 11 | | | | | | | | | | | | | | | | | | | | | | |
| 12 | | | | | | | | | | | | | | | | | | | | | | |
| 13 | | | | | | | | | | | | | | | | | | | | | | |
| 14 | | | | | | | | | | | | | | | | | | | | | | |
| 15 | | | | | | | | | | | | | | | | | | | | | | |
| 16 | | | | | | | | | | | | | | | | | | | | | | |
| 17 | | | | | | | | | | | | | | | | | | | | | | |
| 18 | | | | | | | | | | | | | | | | | | | | | | |
| 19 | | | | | | | | | | | | | | | | | | | | | | |
| 20 | | | | | | | | | | | | | | | | | | | | | | |
| 21 | | | | | | | | | | | | | | | | | | | | | | |
| 22 | | | | | | | | | | | | | | | | | | | | | | |
| 23 | | | | | | | | | | | | | | | | | | | | | | |
| 24 | | | | | | | | | | | | | | | | | | | | | | |
| 25 | | | | | | | | | | | | | | | | | | | | | | |
| 26 | | | | | | | | | | | | | | | | | | | | | | |
| | | | | | | | | | | TOTALS | | | | | | | | | | | | |

MASTER

Inventor:
Hubert Jagger,
By: Zabel, Carlson, Fitzhugh & Wells
Attorneys.

Jan. 30, 1940.  H. JAGGER  2,188,599

DUPLICATING APPARATUS

Filed Oct. 27, 1938    8 Sheets-Sheet 8

Inventor:
Hubert Jagger
By:
Zabel, Carlson, Gilfillan & Wiles
Attorneys

Patented Jan. 30, 1940

2,188,599

UNITED STATES PATENT OFFICE 2,188,599

DUPLICATING APPARATUS

Hubert Jagger, Chicago, Ill., assignor to Ditto, Incorporated, Chicago, Ill., a corporation of West Virginia Application October 27, 1938, Serial No. 237,169

13 Claims. (Cl. 101—133)

This invention relates to duplicating machines of the type illustrated and claimed by United States Letters Patent No. 2,130,962, dated September 20, 1938, and adapted particularly for use with pay rolls for the preparation of pay checks or pay envelopes therefrom. It is the principal object of this invention to provide in connection with a machine of this type a suitable arrangement of supporting and guiding means for record cards so as to permit the data to be transferred conveniently and effectively from the duplicating band of the machine to such cards at any desired points on the cards.

In the use of the machine in question as disclosed by the prior patent above mentioned, a pay roll summary is prepared in hectograph ink upon a master sheet and transferred thence to a hectograph duplicating pad, the master sheet being printed in positive form so as to have a reverse copy on the duplicating pad. In its usual form as preferably to be used with said patented machine, the pay roll summary comprises data with respect to the work of a considerable number of employees arranged in the form of a table, with successive crosslines of data relating to different workers whose names are preferably included as a part of the data. The machine of the patent is provided with means by which a carriage adapted to support a pay envelope or a pay check is moved step by step on the bed of the machine into operative position with respect to the succeeding lines of data so as to copy such data one line at a time upon a series of such checks or envelopes fed into position on the carriage.

The present invention comprises all of the features of the patented machine in connection with means for presenting record cards in the required critical positions with respect to the successive weekly pay roll summaries so as to transfer to a single card all of the data relating to the work of an individual employee as shown on all of the pay roll summaries for a year, or other suitable period as may be selected. For each pay roll summary covering a seven day period and containing data on successive lines with respect to a number of workers, there will be a corresponding number of individual record cards arranged for receiving at successive lines the data from fifty-two successive summaries, for example, so as to cover a period of a year. The work to be performed by this improved machine comprises, in its preferred application, copying for the first week of the year the data from the summary for that week on the twenty-six individual record cards and copying for each succeeding week the data from the corresponding summary likewise on the twenty-six individual record cards. The data making up the summary for the first week as shown by the master sheet for such first week is copied on the first lines of the several record cards, and the data for each succeeding week is copied on the corresponding lines of the twenty-six record cards. In this way, the data from the summary for the first week is divided amongst the first lines of twenty-six cards, the data from the summary for the second week is divided amongst the second lines of the same twenty-six record cards, etc., the names of the workers appearing in the same order and in the same relative positions on succeeding summaries.

For attaining the desired results as above outlined, a tray or table has been provided on the carriage of the patented machine in position to support a record card below the platen roller or other pressure member by which a copy sheet is pressed against the duplicating pad for a printing operation, such tray having a transverse opening therein through which a portion of the record card is depressed for operative engagement with the gelatin facing of the duplicating pad. Upon this tray or table, there is provided suitable margin bar means adjustably mounted in position so as to bring any desired line of a card positioned thereby into the critical printing position for receiving data from the duplicating band. In the use of the improved arrangement for attaining the novel results desired, the position of the carriage controls the line of the summary to be printed, and the position of the card on the carriage as regulated by the margin bar means controls the point on the card at which the printing is effected. Ordinarily the several lines of each pay roll summary are to be printed successively under the control of the step by step movement of the carriage. Under ordinary circumstances, the positions of successive record cards for a printing operation in connection with any week's pay roll summary are to be the same,—that is to say, if the copy is to be placed on the fifteenth line of one record card it is to be placed on the fifteenth line of the accompanying record cards run at the same time. Under these conditions of use, it is very easy for an operator, by the use of this improved mechanism, to run through a bunch of record cards for adding the data from the current summary to the individual record data already on the cards, it being necessary only that the cards be run in the order and sequence corresponding to the positions of the names and accompanying data on the duplicating pad as transferred from the master sheet.

For attaining the desired results easily by the use of a simple structure readily understood and manipulated, and by a structure involving a minimum number of parts arranged compactly and conveniently, a margin bar has been provided adjustable along one portion of the tray for engagement with the top edge of a record card and adjustable along another portion of the tray for engagement with the bottom edge of the record card, the arrangement being such that the adjustment at one point has a continuation effect with respect to the adjustment at the other point.

For giving a maximum of accessibility to the duplicating pad for assisting in the operation of stripping cards or other copy sheets from the pad after the printing operation, one end portion of the tray or table has been mounted so as to be capable of swinging upwardly out of the way. In the preferred form of construction, supporting wheels have been provided on the tray or table adapted by engagement with the framework of the machine to assist in supporting the tray so as to have an easy and smooth movement along the bed.

It is another object of the invention to improve devices of this type in sundry details hereinafter pointed out. The preferred means by which the several objects of the invention have been attained are shown in the accompanying drawings, in which—

Fig. 1 is a side view of the improved machine;

Fig. 2 is a diagrammatic view showing fragmentary parts of the framework and operating means as seen from the left in Fig. 1;

Fig. 3 is a vertical sectional view taken substantially at the line 3—3 of Fig. 1;

Fig. 4 is a top plan view of the machine as shown in Fig. 1;

Fig. 5 is a top plan view on an enlarged scale of a portion of the machine as shown in Fig. 4, with an individual employee's record card in position on the machine, and with the carriage moved to the limit of its motion toward the left in said figure;

Figs. 6 and 7 are vertical sectional views taken substantially at the line 6—6 and the line 7—7 respectively of Fig. 4;

Fig. 8 is a view similar to Fig. 7 but showing a changed position of the parts;

Fig. 9 is a vertical sectional view taken on an enlarged scale substantially at the line 9—9 of Fig. 5;

Fig. 10 is a top plan view of a fragmentary portion at one end of the front margin bar;

Fig. 11 is an edge view of a portion of said margin bar;

Figs. 12 and 13 are vertical sectional views taken on an enlarged scale at the line 12—12 and the line 13—13 respectively of Fig. 5;

Fig. 14 is a perspective view of a clip by which the margin bar is held releasably in adjusted position;

Fig. 15 is a diagrammatic view showing on an enlarged scale certain of the framework and operating parts, as seen in Fig. 1, with some of the parts broken away and with other parts omitted;

Fig. 16 is a face view of a master sheet illustrating a blank partially filled out for showing the pay roll data for one week's operation;

Fig. 17 is a face view of an individual worker's record card, partially filled out by transfer of data from the master sheet of Fig. 16; and Fig. 18 is a face view of a pay check filled out by transfer of appropriate data from said master sheet.

The improved machine forming the subject matter of this application is designed for use in connection with a pay roll summary such as that shown on the face of a master sheet 25 as illustrated in Fig. 16 of the drawings, such master sheet having data thereon prepared with hectograph ink in tabular form, the master sheet shown being provided with twenty-six numbered lines or spaces transversely thereof for the names of twenty-six workers, the particular arrangement shown in said Fig. 16 being applicable to operations for a week. A new pay roll summary similar to that shown on the master sheet 25 would of course be provided for each week of operation.

An individual record card 26 is shown in Fig. 17, such card having the name of the worker at the top and being provided with twenty-six lines below for the application of pay roll data from week to week thereto, such card being applicable to a half year's work. The card 26 is preferably arranged in the same way on its opposite face so as to be applicable also to a second six months' period. The card 26 as shown applies to the worker John Doe whose name appears at the first line of the pay roll summary as shown on the master sheet 25, such name appearing also at a corresponding point upon each successive pay roll summary from week to week. The invention contemplates the application of the data from the first line of the pay roll summary for the first week of a year to the first line of the card 26, the application of the data from the first line of the pay roll summary for the second week of the year to the second line of the card 26, and so on throughout the year. The data from the master sheet 25 as applied to the record card 26 is found in line thirteen of the card, showing that the pay roll summary as shown upon the master sheet 25 is for the thirteenth week of the yearly period.

A pay roll check 27 is shown in Fig. 18 containing the data from the thirteenth line of the record card 26.

The machine for making the desired reprints of the data from the master sheet to the individual record cards and to the pay roll checks, or to pay roll envelopes if desired, is substantially like that shown in Letters Patent No. 2,130,962 above mentioned, the mechanism as shown in said patent having had certain additions thereto as hereinafter set forth. The description of the machine and its operation will be made comparatively brief in view of its similarity in large part to the patented structure.

As shown in Fig. 1 of the drawings, the machine of this application comprises a frame 28 supported in the arrangement shown from a table or cabinet 29. In the arrangement shown, the frame 28 comprises two oppositely disposed frame bars 30 (see Fig. 3) upon which other frame bars 31 are mounted so as to provide a longitudinally extending slot 32 at each side of the machine. Underneath the bars 31, there is mounted a transversely extending frame member 33 which has upwardly extending arm portions 34 at its ends in slightly spaced relation to the side faces of the frame bars 31. Upon the upper ends of the arms 34, there is releasably mounted a transverse frame member 35. The frame members 33 and 35 constitute the principal carrying parts which are adapted to be moved back and forth over the frame 28, the member 35 and the parts carried thereby being termed the carriage, and the member 33 and the parts immediately associated therewith being termed a second carriage. The two carriages are releasably connected together by any suitable means not shown.

The means for mounting the carriages movably upon the frame 28 comprises bars 36 carried by the frame member 33 slidably connected with a channel structure 37 by means of bearing balls 38, the channel structure 37 being connected in any suitable manner with the frame bar 31 at each side of the machine.

Between the frame bars 31 there is mounted a bed plate 39 of any approved form over which a duplicating pad or band 40 is stretched, such duplicating pad being preferably of the type having a gelatinized face so as to be capable of receiving the ink from the master sheet 25 in a well understood manner. The means for mounting the duplicating pad in position so as to be adjustable thereon is not illustrated, since it forms in and of itself no part of the present invention. An operating member 41 is shown in Figs. 1 and 4 for effecting an adjustment of the duplicating band.

Upon the frame plate 35, there is mounted a housing 42 of sheet metal pressed into form, as is best shown in Figs. 6 and 7, such housing extending across the machine from one side to the other, as is clearly shown in Fig. 4. Within the housing 42, there is mounted a platen roller 43 so as to be free to rotate and so as to be movable vertically toward and from the duplicating pad 40. In the arrangement shown, the platen roller 43 is mounted by means of a shaft 44 journaled at its ends in the arms of a yoke 45 which is pivotally mounted upon a shaft 46 journaled at its ends in the end walls of the housing 42. For turning the shaft 46 so as to swing the yoke 45 and the platen roller 43 vertically toward and from the duplicating pad, a handle 47 is mounted upon the shaft at an intermediate point therealong, such handle being provided with a forwardly extending lug 48 thereon (see Fig. 6). The arrangement is such that when the lever or handle 47 is standing in its normal position as shown in Fig. 7 the platen roller 43 is held in raised position as shown in Fig. 7, the platen roller being given an operative stroke downwardly toward the duplicating pad upon a backward stroke of the handle 47 into the position as shown in Figs. 6 and 8.

Means is provided at the rear edge portion of the housing 42 for supporting a copy sheet in the form of a pay check or a pay envelope, such means comprising an obliquely disposed tray or table 49 along which a copy sheet such as a pay check 50 is slidable into engagement with a margin bar 51. In the arrangement shown, the margin bar 51 is movably mounted in position by means of brackets 52 which in turn are pivotally mounted upon pins or rivets 53 carried by the end walls of the housing 42. Coiled springs 54 are connected at their inner ends with the brackets 52 and at their forward ends with the shaft 46 serving normally to hold the brackets in the position as shown in Fig. 7 with the margin bar 51 in substantial alignment with the tray 49 so as normally to engage the forward edge of a check or other copy sheet carried by said tray. The arms of the yoke 45 are provided with pins 55 in position to engage the brackets 52 upon downward movement of the yoke so as to swing the brackets and the margin bar 51 in clockwise direction from the position as shown in Fig. 7 to the position as shown in Figs. 6 and 8 against the action of the springs 54. A spring 56 is provided upon the shaft 46 so as to engage the yoke 45 serving normally to hold the lever or handle 47 in substantially vertical position as shown in Fig. 7, with the platen roller 43 in raised position. A pressure roller 57 is journaled in position adjacent to the platen roller 43 so as to be adapted by cooperation with the platen roller to grip a copy sheet such as the check 50 when pushed downwardly by the platen roller as shown in Fig. 8.

Upon the front face of the housing 42, a transversely extending lever 58 is pivotally mounted by means of a pin or rivet 58a (see Fig. 2), such lever 58 having its inner end positioned underneath the lug 48 carried by the handle or lever 47. The arrangement is such that upon forward movement of the lever 47 from the position as shown in Fig. 8 to the normal position as shown in Fig. 7, the lever 58 is swung in counterclockwise direction in Fig. 2 for raising its outer end for effecting a movement of associated means as hereinafter described.

The means for giving the carriage a step by step movement toward the right in Figs. 1 and 6 comprises a pair of levers 59 and 60 which have releasable engagement with a rack bar 61 carried by the frame 28. The lever 59, as is best shown in Fig. 15, is pivotally connected by means of a pin or rivet 59a at an intermediate point with a bellcrank lever 62 which is pivotally mounted upon a pin or bolt 63 carried by a longitudinally extending bar 64 mounted upon the frame bar 33 (see Fig. 3). As is best shown in Fig. 15, the bar 64 is connected with the frame member 33 by means of machine screws 65 and 66. At the forward end of the forwardly extending arm of the bellcrank lever 62, two lugs 67 and 68 are provided in vertically spaced relation to each other.

Upon the pin or bolt 63 adjacent to the bellcrank lever 62, there are provided two short arms or levers 69 and 70 with a ratchet wheel 71 mounted therebetween, all of such parts being loosely mounted upon said bolt 63. Between the free forward ends of the levers 69 and 70, there is mounted a pawl 72 having its rear end in engagement with the ratchet wheel 71 so that upon movement of the arms or levers 69 and 70 in clockwise direction in Fig. 15 the ratchet wheel is given a corresponding rotary movement. A second pawl 73 is likewise mounted so as to engage the ratchet wheel 71, such pawl 73 being pivotally mounted upon the arm 34 of the frame member 33 (see Figs. 3 and 15). The pawl 73 normally is supported in full operative engagement with the ratchet wheel 71 by an arm 74 rising from the lever 60. The lever 60 is pivotally mounted by means of a bolt 75 upon a bracket 76 carried by the arm 34 of the frame member 33.

In the arrangement shown, the lever 70 is connected by a coiled spring 77 with an arm 78 carried by the bracket 76 so as normally to hold the levers 69 and 70 in lowered position in engagement with the lug 67 of the bellcrank lever 62. The rear end of the lever 60 is connected by means of a spring 79 with the machine screw 66 directly above so as to hold the lever 60 normally turned to the limit of its movement in counterclockwise direction in Fig. 75

15. A spring 80 connected between the downwardly extending arm of the bellcrank lever 62 and a suitable portion of the framework serves normally to hold the bellcrank lever turned to the limit of its movement in counterclockwise direction in said Fig. 15. A flat spring 81 carried by the bracket 76 and bearing on the lever 59 normally holds such lever turned to the limit of its motion in counterclockwise direction in said Fig. 15.

As is clearly shown in Figs. 1 and 15, the rack bar 61 is provided with a plurality of substantially square notches 82 arranged in spaced relation to each other therealong, together with a substantially V-shaped notch 83 in its forward end. For convenience of reference thereto, the first two of the square notches at the forward end of the bar 61 are designated as 82a and 82b, respectively (see Fig. 15). The forward end portions of the levers 59 and 60 are turned downwardly to provide arms or lugs 84 and 85 thereon, the lug 84 being shaped to conform to the shape of the notch 83. The lower end portion of the lug 85 of the lever 60 is turned into horizontal position so as to provide an engaging portion 86 in position to engage one or another of the notches 82 in the rack bar 61.

With the parts in the arrangement as shown in Fig. 7, with the handle or lever 47 in its normal substantially upright position, and with the lug 86 of the lever 60 engaging the notch 82a of the rack bar 61, the lever 58 will be standing with its inner end depressed and its outer end raised so as to hold the arms 69 and 70 in their uppermost position, such arms in this position serving by engagement with the lug 68 on the bellcrank lever 62 to hold the lever 62 swung backwardly to the limit of its motion about the pivot pin 59a. In this position of the parts, the lug 84 of the lever 59 will be standing in engagement with the top face of the rack bar 61 at the left of the notch 83.

Under these conditions, a blank check 50 will be placed face downwardly upon the obliquely disposed supporting tray 49 and moved downwardly into engagement with the margin bar 51, whereupon the machine is ready for an operative stroke of the handle or lever 47 backwardly for printing data from the duplicating pad 40 upon the check. Upon the initial movement of the lever 47 backwardly, the lever 58 is swung in clockwise direction in Fig. 2 for permitting the spring 77 to swing the arms 69 and 70 downwardly and to swing the bellcrank lever 62 in counterclockwise direction in Fig. 15 for carrying the lever 59 into position for permitting the lug 84 to engage the notch 83 of the rack bar 61 under the influence of the flat spring 81. Upon the continued movement of the lever 47 backwardly, the platen roller 43 is brought into operative engagement with the check 50 which is pressed downwardly by the platen roller into operative engagement with the duplicating pad 40 for a transfer of the first line of printing from the pad 40 to the check.

After the proper pressure has been applied upon the check 50, the lever 47 is again moved manually to its normal forward position. The arrangement of the parts is such that upon the upward movement of the platen roller 43 such roller cooperates with the pressure roller 57 for stripping the check from the gelatin pad 40. At the same time, the lug 48 by engagement with the lever 58 causes the outer end of said lever 58 to move upwardly for raising the arms 69 and 70 so as to give the pawl 72 an operative stroke for rotating the ratchet wheel 71 in clockwise direction in Fig. 15. This rotation of the ratchet wheel 71 serves to force the pawl 73 downwardly by a camming action thereon so as to press downwardly on the arm 74 carried by the lever 60 for causing such lever 60 to swing in clockwise direction in Fig. 15 out of engagement with the rack bar 61 against the action of the spring 79. As the upward swinging movement of the arms 69 and 70 continues, such arms are brought into engagement with the lug 68 carried by the bellcrank lever 62, after which the still further continued upward swinging of the arms causes the bellcrank lever to swing backwardly about the pivot pin 59a so as to carry the pin 63 and the carriage upon which such pin is mounted toward the right in Fig. 15 for bringing the lug 86 of the lever 60 into position directly above the notch 82b of the rack bar 61. The arrangement is such that at the time when the lug 86 comes opposite to said notch 82b in the rack bar, the ratchet wheel 71 in its rotary movement reaches such a position that the pawl 73 clears the engaged tooth of the ratchet wheel so as to permit the spring 79 to swing the lever 59 in counterclockwise direction in Fig. 15 for bringing the lug 86 into engagement with said notch 82b and for bringing the pawl 73 into engagement with the next adjacent tooth of the ratchet wheel.

At the end of the step of operation as above described, the handle or lever 47 will be again in substantially upright position, with the lever 60 engaging the notch 82b of the rack bar 61, and with the downwardly projecting lug 84 of the lever 59 engaging the notch 83, the bellcrank lever 62 being held then against a return swinging movement to the position as shown in Fig. 15 by the lever 58 which continues to hold the arms 69 and 70 at this time in their uppermost position. Upon the next subsequent stroke of the handle or lever 47 backwardly after the insertion of a new check upon the tray 49, the arms 69 and 70 are moved downwardly again by the spring 77 as above described, such spring 77 serving also to move the bellcrank lever 62 in counter-clockwise direction about the pin 63 to the position as shown in said Fig. 15, such counter-clockwise movement of the lever 62 serving to shift the lever 59 from its engagement with the notch 83 to engagement with the notch 82a.

As is clearly shown in Fig. 1, the frame bar 31 at the near side of the machine is provided with a forwardly projecting lug 87 which is held adjustably in position, in the arrangement shown, by a mechanism comprising a set-screw 88. At the forward end of the machine, a bracket 89 is provided, pivotally mounted upon a horizontal axis so as to be movable into and out of position in alignment with the lug 87, such bracket in the arrangement shown being in the form of an angle bar comprising a vertically extending arm by which the bracket is swingingly mounted in position and a longitudinally extending arm fixedly mounted on the end of the vertically disposed arm.

Upon the frame member 34 of the carriage, there is mounted an arm or lever 90 adapted to swing backwardly and forwardly about a transverse horizontal axis and provided with a pin 91 at its end extending transversely of the machine into position between the lug 87 and the bracket 89. The arrangement is such that, upon backward movement of the carriage toward the right in Fig. 1 to the limit of its movement, the pin 91 is brought into engagement with the lug 87 so as to swing the lever 90 toward the left in Fig. 1 into engagement with a stop pin 90a carried by the carriage frame member 34. In this movement of the lever 90, the pin 91 pushes downwardly on the levers 59 and 60 at their rear end portions so as to lift the forward ends of such levers out of engagement with the rack bar 61 against the action of the springs 81 and 79. Inasmuch as the lever 90 and the pin 91 in their movement toward the left in Fig. 1 by contact with the lug 87 as above described move into past-center position with respect to the axis of said lever 90, the levers 59 and 60 are of course retained in their inoperative position until such lever 90 is swung again toward the right into its normal position as shown in Fig. 15. The arrangement is such that, when the carriage is moved to the limit of its motion toward the left in said Fig. 15, with the bracket 89 in its operative raised position as shown in solid lines, the bracket 89 engages the pin 91 so as to swing the lever 90 again into its normal position as shown in Fig. 1.

In Fig. 5, the carriage is shown at the forward limit of its motion, with the pin 91 and the lever 90 already moved backwardly by engagement with the bracket 89, the parts being in condition for the movement of the carriage toward the right into the position as shown in Fig. 1. In such movement of the carriage, the lever 60 with its broad engaging lug 86 is held out of engagement with the V-shaped notch 83 but is permitted to drop into engagement with the first square notch 82a at the left as shown in said figure so as to stop the backward movement of the carriage. Under these circumstances, the lever 59 stands in position with its lug 84 engaging the top face of the rack bar 61 at the left of the notch 83, the lever 59 being adapted to remain in this position until the bellcrank lever 62 is swung in counter-clockwise direction in Fig. 15 into the position as there shown, which movement of the bellcrank lever takes place upon the next succeeding movement of the handle or lever 47 backwardly into the position as shown in Fig. 6 and being timed to occur at about the time when the platen roller 43 reaches its lowermost position.

It will be understood that the lever 90 may be moved manually, independently of the action of the lug 87 and the bracket 89, into its operative position in which it holds the levers 59 and 60 out of engagement with the rack bar 61. It will be understood also that when the lever 90 is in its forward operative position, with the bracket 89 swung downwardly out of its operative position, the carriage is then free to move back and forth to the limit of its motion in either direction so as to be capable then of being employed like an ordinary hectograph duplicating machine independently of any step by step forwarding movement of the carriage.

In Fig. 5 of the drawings, a record card 26 is mounted in position underneath the platen roller 43, the pressure roller 57, and the tray 49. As is explained above, for the desired operation of the machine, the record card 26 must be mounted so as to be adjustable with respect to the carriage so as to bring different portions of the card at different times to the printing position in the machine.

For carrying out this purpose, a tray or table 92 is provided in substantially horizontal position upon the carriage. This tray 92 comprises a piece of sheet metal fixedly mounted upon the housing 42 underneath the platen roller, such tray being provided with supporting wheels 93 at its rear edge portion in position to run upon the frame bars 31, as is clearly shown in Figs. 4 and 5. At its forward edge portion, the tray comprises a portion in the form of a leaf 94 hingedly mounted at 95 upon the plate 92, the leaf 94 being provided with supporting wheels 96 thereon likewise in position to run upon said frame bars 31. In the arrangement shown, the hinges 95 are made readily detachable from the front edge of the plate 92 so as to provide for an easy removal of the leaf portion 94 of the tray if such procedure is deemed desirable.

As is best shown in Figs. 5 and 13, the leaf 94 is made detachable in the construction illustrated by the provision of notched hinge plates 95a adapted to be mounted in position upon the tray member 92 by means of cups 97 pressed downwardly on machine screws 98 by springs 99.

At opposite sides of the machine, the tray, comprising the tray member 92 and the leaf 94, is provided with side bars 100 and 101, respectively, rigidly secured in position, such side bars being provided with notches 102 in their inner faces for the reception of tongues 103 formed upon the opposite ends of a transverse margin bar 104. The notches 102 in the side bars 100 and 101 are spaced longitudinally of the side bars at a distance from each other therealong corresponding to the spacing of the lines on the body of the card 26. As a result of this arrangement, when the margin bar 104 is transferred from one set of notches 102 to the adjacent set of notches the card whose position is controlled by edge contact with the margin bar is shifted so as to bring a different one of the lined spaces thereon into the critical printing position with respect to the platen roller 43.

For assistance in keeping the margin bar in position, the bar is provided with a plurality of downwardly projecting pins 105 therealong which fit into openings 106 in the tray. Spring clips 107 are also provided, as is best shown in Fig. 14, adapted to be slipped into position upon the outer edges of the side bars 100 and 101 so as to overlie the ends of the margin bar, as is best shown in Fig. 12. As will be readily understood, the spring clips 107 while in position prevent the removal of the margin bar from its adjusted arrangement.

Upon the margin bar 104, there is preferably provided a margin device 108 which in the arrangement shown is held in position by a screw 109 which engages a threaded opening in the margin bar.

As is clearly shown in Fig. 5, the notches 102 are numbered consecutively from 1 to 13 at the left, and from 14 to 26 at the right. As will be readily understood, when the margin bar is in the thirteenth notch position as shown in Fig. 5, the card 26 by engagement therewith is held in position for receiving a line of printing on the thirteenth line of the card. When it is desired thereafter to print at the fourteenth line of the card, the margin bar 104 is shifted from the number 13 notches at the left to the number 14 notches at the right, whereupon the end of the card at the right is used as a guide rather than the end of the card at the left as shown in said Fig. 5. By this arrangement, the machine is made very simple and very convenient for use while at the same time the size of the tray comprising the member 92 and the leaf 94 is kept to a minimum.

With the duplicating band of the machine provided with data from a pay roll summary for the thirteenth week of a year, or other selected period, and with twenty-six cards at hand corresponding to the workers whose data is set forth on the master sheet reproduced in reverse on the duplicating band, the carriage is first set in the position as shown in Fig. 4, with the numeral 1 upon the side bar 31 of the machine appearing at the front edge of the carriage, such numeral 1 being one of a series of numerals at 110. The margin bar 104 will also be set at the thirteenth notch position as shown in Figs. 4 and 5 so as to insure that the entries on the several cards shall be made at the thirteenth line in each instance. With the handle or lever 47 in the position as shown in Fig. 7, the first one of the record cards is placed in position upon the tray 92—94, as shown in Fig. 6, with one end against the margin bar 104 at the front of the machine. The lever 47 is then moved backwardly to the position as shown in Fig. 6 for causing the platen roller 43 to press the card 26 against the duplicating pad 40, a transverse slot 111 being provided in the tray for permitting the card to be pressed downwardly into engagement with the pad. After the first line of the subject matter on the duplicating pad has been thus printed upon the thirteenth line of the card 26 in the machine, the lever 47 is swung forwardly for raising the platen roller 43 and for shifting the position of the carriage as above described. The next succeeding card 26 is then placed in position, and the process is repeated just as above described, except that upon the second card the second line of the data on the duplicating pad is reproduced at the thirteenth line of such second card.

After the twenty-six cards 26 have been run through the machine as described, the carriage may then be moved again into the position as shown in Fig. 4 for printing pay checks in the same order, the carriage being given a step by step movement so as to present the checks in turn at different lines of the data on the duplicating pad. For printing the pay checks, the margin bar 51 would be employed as shown in Fig. 7, rather than the margin bar 104 as described in connection with the record cards.

If it is desired that additional copies of the pay roll summary as a whole be prepared, the bracket 89 would be moved downwardly out of operative position into the position shown in dotted lines in Fig. 1, and the lever or arm 90 would be moved toward the left in Fig. 1 so as to hold the levers 59 and 60 out of engagement with the rack bar 61. The carriage would then be brought again to the position as shown in Fig. 4, whereupon a copy sheet of any suitable type would be positioned upon the tray 92—94, preferably in centered position with respect to the data to be copied. The lever or handle 47 would then be pressed backwardly into the position shown in Fig. 6 and the carriage would be moved backwardly by pressure on said handle 47 so as to cause the platen roller 43 to transverse the full length of the subject matter on the duplicating band, after which the copy sheet would be stripped from the band. For accomplishing the stripping operation, the leaf 94 of the tray would preferably be swung upwardly on the hinges 95 so as to enable the operator to have access to a large degree to the face of the duplicating pad.

While the arrangement as shown and described is preferred, it is to be understood that the invention is not to be limited to the construction and arrangement shown except so far as the claims may be so limited, it being understood that changes might well be made from what is illustrated without departing from the spirit of the invention.

I claim:

1. In a duplicating machine, the combination of a frame, means for mounting a duplicating pad on said frame, a carriage movable along said duplicating pad, means for giving said carriage a step by step movement horizontally on said frame, means for holding a copy sheet in any one of a plurality of adjusted positions with respect to said carriage longitudinally of the machine, and means for pressing a portion only of said copy sheet into operative copying relation to said duplicating pad.

2. In a duplicating machine, the combination of a frame, means for mounting a duplicating pad on said frame, a carriage movable along said duplicating pad, means for giving said carriage a step by step movement horizontally on said frame, means on said carriage for holding a copy sheet in sharply inclined position above said duplicating machine, means on said carriage for supporting a copy sheet alternatively in substantially flat horizontal position in any of a plurality of different positions of adjustment with respect to the carriage longitudinally of the machine, and means for pressing a portion only of said copy sheet in either of said two positions into operative copying relation to said duplicating pad.

3. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, tray means on said carriage located partially in front of said platen and partially behind it for supporting a copy sheet in substantially horizontal position underneath the platen, margin bar means adjustable toward and from said platen on said tray means, and means for moving said platen downwardly for pressing a portion only of said copy sheet into operative copying relation to said duplicating pad.

4. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, means carried by said carriage for holding a copy sheet in substantially horizontal position underneath said platen in downwardly spaced relation thereto, margin bar means adjustably mounted on said holding means in widely spaced relation horizontally with respect to said platen for holding the copy sheet in any of a plurality of different adjusted positions with respect to the platen, and means for moving said platen downwardly for pressing a portion only of said copy sheet into operative copying relation to said duplicating pad.

5. In a duplicating machine, the combination of a frame, means for mounting a duplicating pad on said frame, a carriage movable along said duplicating pad, means for giving said carriage a step by step movement horizontally on said frame, a platen roller rotatably mounted on said carriage and movable vertically thereon, margin bar means normally located beneath said platen roller, means actuated upon a downward stroke of the platen roller for displacing said margin bar means out of the path of the platen roller, tray means for supporting a copy sheet in substantially horizontal position underneath said platen roller and said margin bar means, other margin bar means on said tray means and adjustable toward and from said platen roller for adjusting said copy sheet to any of a plurality of different positions on the tray means, and means for moving said platen roller downwardly for pressing a portion of said copy sheet into operative copying relation to said duplicating pad after each step of movement of the carriage horizontally.

6. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, a tray interposed between said platen and said duplicating pad for supporting a copy sheet in substantially horizontal position and having an opening therein through which an intermediate portion of the copy sheet is moved by said platen into copying relation with said duplicating pad, and means for moving said platen toward and from said duplicating pad.

7. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, a tray interposed between said platen and said duplicating pad for supporting a copy sheet in substantially horizontal position and having an opening therein through which a portion of the copy sheet is moved by said platen into copying relation with said duplicating pad, means on said tray for holding a copy sheet in adjusted position horizontally with respect thereto for bringing different selected portions of the copy sheet into position above said opening in the tray, and means for moving said platen toward and from said duplicating pad.

8. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, a tray interposed between said platen and said duplicating pad for supporting a copy sheet in substantially horizontal position and having an opennig therein through which a portion of the copy sheet is moved by said platen into copying relation with said duplicating pad, a margin bar adjustably mounted on said tray adapted by engagement with an edge portion of a copy sheet to hold said copy sheet in adjusted position on the tray with different selected portions of the copy sheet in position above said opening in the tray, and means for moving said platen toward and from said duplicating pad.

9. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, a tray interposed between said platen and said duplicating pad for supporting a copy sheet in substantially horizontal position and having an opening therein through which a portion of the copy sheet is moved by said platen into copying relation with said duplicating pad, side bars on said tray having notches therein, a margin bar adjustably mounted in said notches in transverse position with respect to the machine adapted by engagement with an edge portion of a copy sheet on the tray to control the position of the copy sheet with respect to the duplicating pad, and means for moving a platen toward and from said duplicating pad.

10. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, a tray interposed between said platen and said duplicating pad for supporting a copy sheet in substantially horizontal position and having an opening therein through which a portion of the copy sheet is moved by said platen into copying relation with said duplicating pad, side bars on said tray having notches therein, a margin bar adjustably mounted in said notches in transverse position with respect to the machine adapted by engagement with an edge portion of a copy sheet on the tray to control the position of the copy sheet with respect to the duplicating pad, means for locking said margin bar releasably in adjusted position on said tray, and means for moving said platen toward and from said duplicating pad.

11. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, a tray interposed between said platen and said duplicating pad for supporting a copy sheet in substantially horizontal position and having an opening therein through which a portion of the copy sheet is moved by said platen into copying relation with said duplicating pad, side bars on said tray having notches therein, a margin bar adjustably mounted in said notches in transverse position with respect to the machine adapted by engagement with an edge portion of a copy sheet on the tray to control the position of the copy sheet with respect to the duplicating pad, spring clips adapted to be slid into position on said slide bars overlying the ends of said margin bar for holding said margin bar releasably in adjusted position, and means for moving said platen toward and from said duplicating pad.

12. In a duplicating machine, the combination of a frame, means for mounting a duplicating pad on said frame, a carriage movable along said duplicating pad, means for giving said carriage a step by step movement horizontally on said frame, a platen mounted on said carriage and movable vertically thereon, a tray interposed between said platen and said duplicating pad for supporting a copy sheet in substantially horizontal position and having an opening therein through which a portion of the copy sheet is moved by said platen into copying relation with said duplicating pad, a margin bar adjustably mounted on said tray adapted by engagement with an edge portion of a copy sheet to hold said copy sheet in adjusted position on the tray, pins carried by said margin bar in spaced relation to each other therealong and engaging correspondingly positioned openings in said tray, and means for moving said platen toward and from said duplicating pad, said tray being provided with a plurality of rows of openings longitudinally thereof for reception of the pins on the margin bar at the several adjusted positions of the margin bar on the tray.

13. In a duplicating machine, the combination of a frame, means for mounting a duplicating pad on said frame, a carriage movable along said duplicating frame, means for giving said carriage a step by step movement horizontally on said frame, a platen mounted on said carriage and movable vertically thereon, a tray interposed between said platen and said duplicating pad for supporting a copy sheet in substantially horizontal position and having an opening therein through which a portion of the copy sheet is moved by said platen into copying relation with said duplicating pad, the forward edge portion of said tray being in the form of a hingedly mounted leaf adapted to be lifted for access to the duplicating pad therebelow, supporting wheels journaled on said leaf for assisting in supporting the tray, and means for moving said platen toward and from said duplicating pad.

HUBERT JAGGER.